United States Patent
Kim et al.

(10) Patent No.: US 7,341,370 B2
(45) Date of Patent: Mar. 11, 2008

(54) LIQUID CRYSTAL DISPLAY APPARATUS

(75) Inventors: Hyoung-Joo Kim, Uiwang-si (KR);
Dong-Hoon Kim, Suwon-si (JP);
Jong-Dae Park, Seoul (KR);
Jeong-Hwan Lee, Suwon-si (KR);
Jae-Ho Jung, Yongin-si (KR);
Sang-Hyuck Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 103 days.

(21) Appl. No.: 10/542,748

(22) PCT Filed: Mar. 6, 2004

(86) PCT No.: PCT/KR2004/000478

§ 371 (c)(1),
(2), (4) Date: Jul. 18, 2005

(87) PCT Pub. No.: WO2004/081636

PCT Pub. Date: Sep. 23, 2004

(65) Prior Publication Data

US 2006/0067088 A1   Mar. 30, 2006

(30) Foreign Application Priority Data

Mar. 10, 2003  (KR) ............... 10-2003-0014837

(51) Int. Cl.
*F21S 4/00* (2006.01)

(52) U.S. Cl. ............... 362/634; 362/633; 362/225; 362/264

(58) Field of Classification Search ........ 362/559–561, 362/613, 614, 632–634, 29, 30, 224, 225, 362/260, 267, 263–265, 396, 365, 368, 97; 349/58–60
See application file for complete search history.

(56) References Cited

U.S. PATENT DOCUMENTS

| | | | |
|---|---|---|---|
| 6,722,773 B2 * | 4/2004 | Tsai et al. ................. 362/216 |
| 6,905,224 B2 * | 6/2005 | Yoo et al. ................. 362/225 |
| 2003/0231512 A1 * | 12/2003 | Bang et al. ................. 362/560 |

FOREIGN PATENT DOCUMENTS

| | | | |
|---|---|---|---|
| DE | 3935842 A1 | | 5/1991 |
| JP | 06-121260 | * | 4/1994 |
| JP | 06-202103 | | 7/1994 |
| JP | 2003-045220 | | 2/2003 |

* cited by examiner

*Primary Examiner*—Sandra O'Shea
*Assistant Examiner*—Bao Q. Truong
(74) *Attorney, Agent, or Firm*—F. Chau & Associates, LLC.

(57) ABSTRACT

In a backlight assembly capable of improving display quality and an LCD apparatus having the backlight assembly, the backlight assembly includes a lamp and an insulating member. The lamp includes a lamp tube and an electrode disposed on an end portion of the lamp tube. The insulating member is combined with the end portion of the lamp so as to surround the electrode and to prevent a heat generated from the electrode from being conducted toward the lamp tube. Therefore, a display quality of the LCD apparatus is improved.

18 Claims, 6 Drawing Sheets

[Fig. 1]
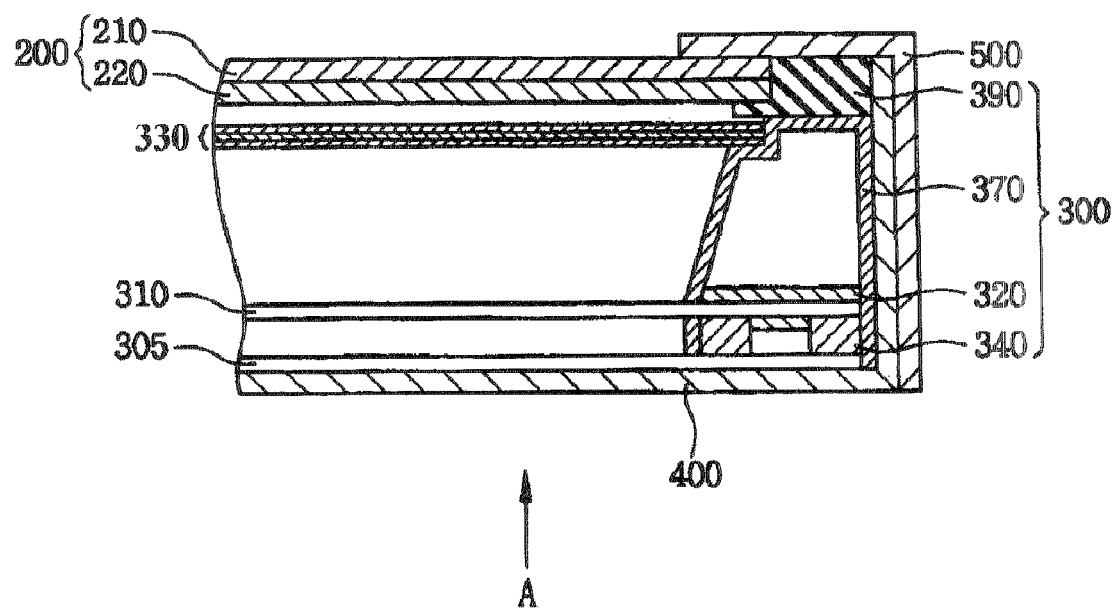

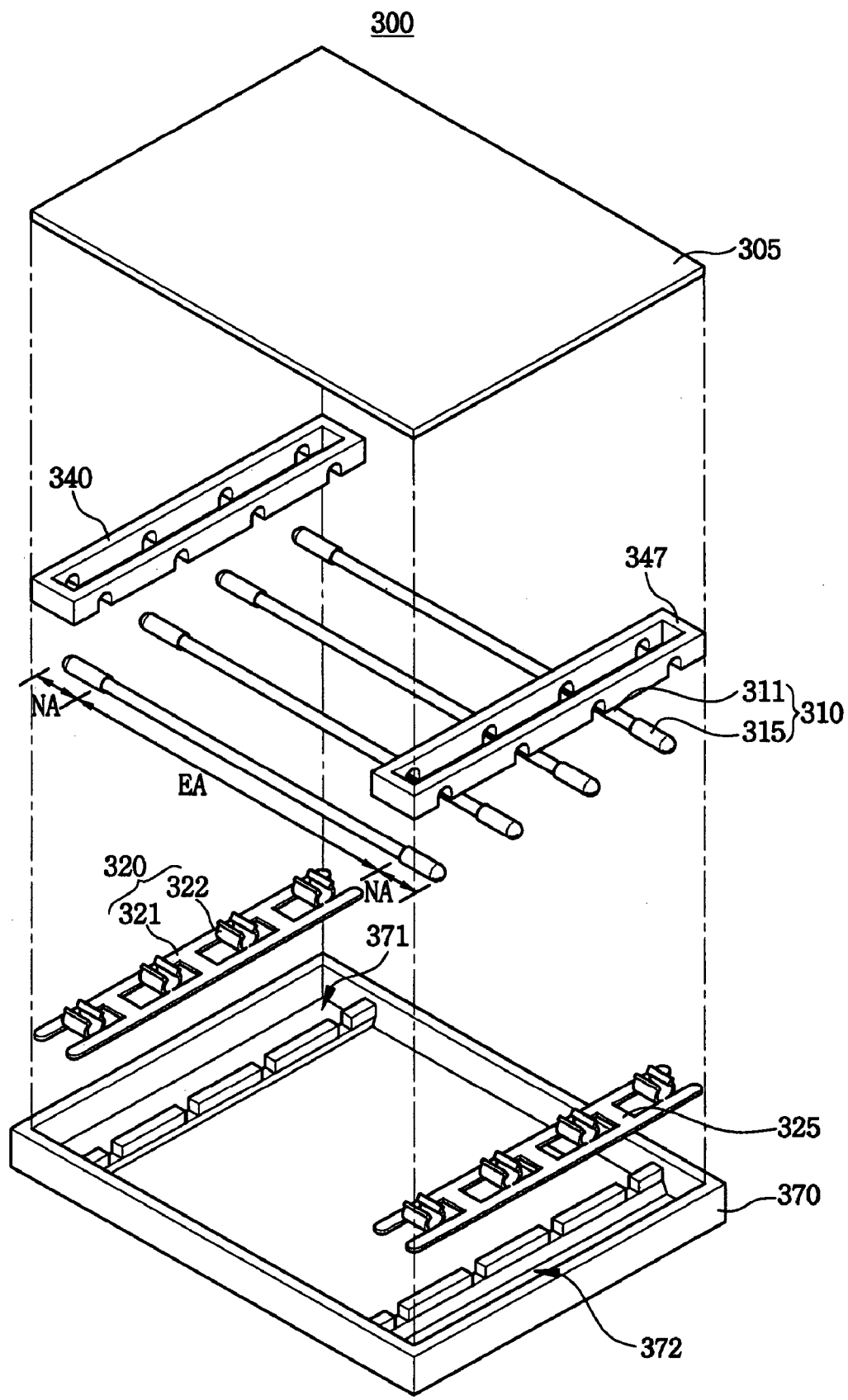
[Fig. 2]

[Fig. 3]
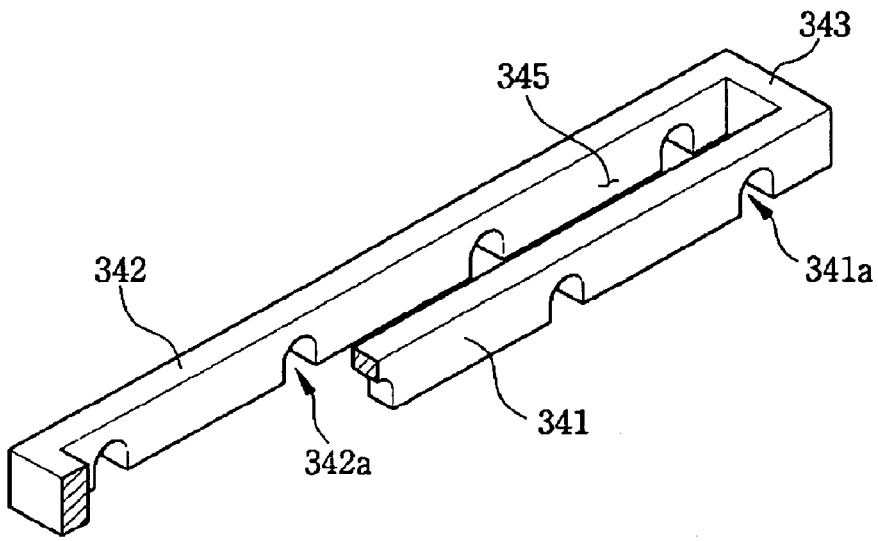
[Fig. 4]
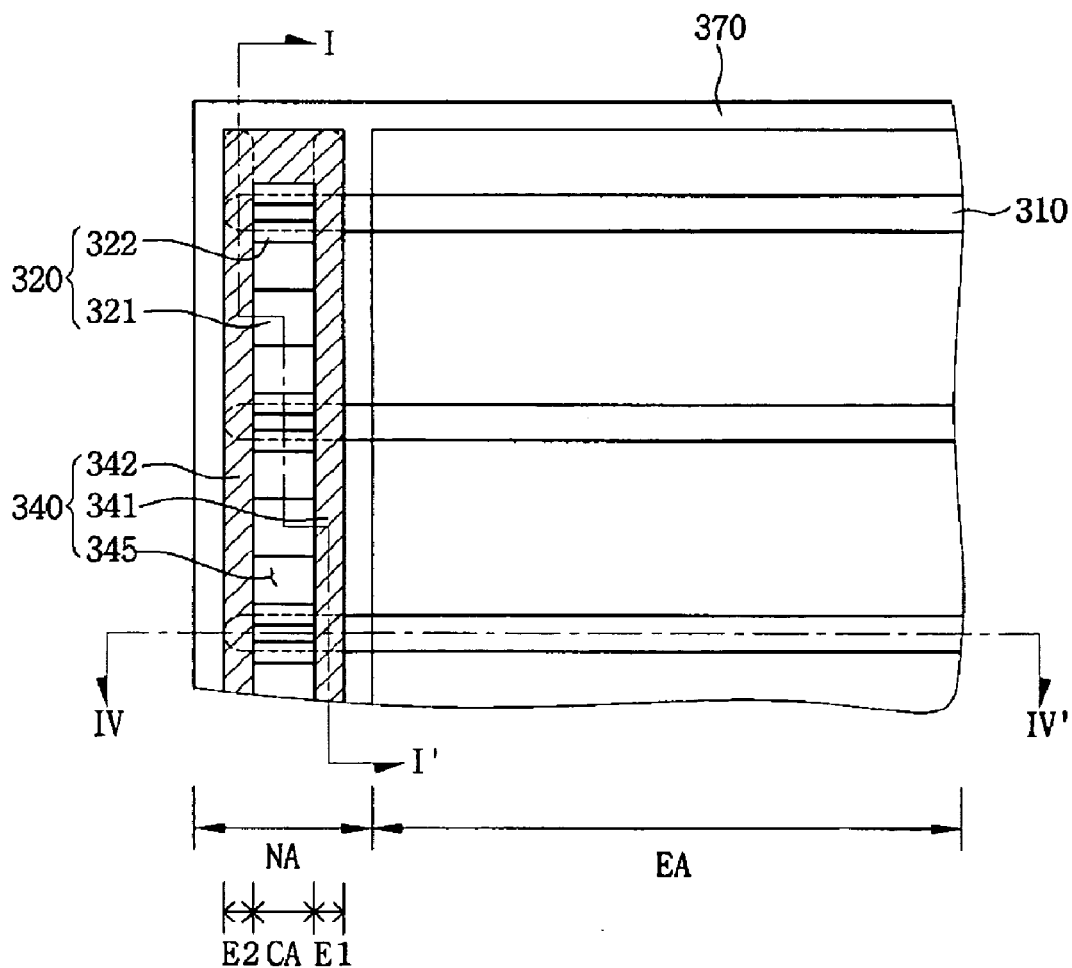

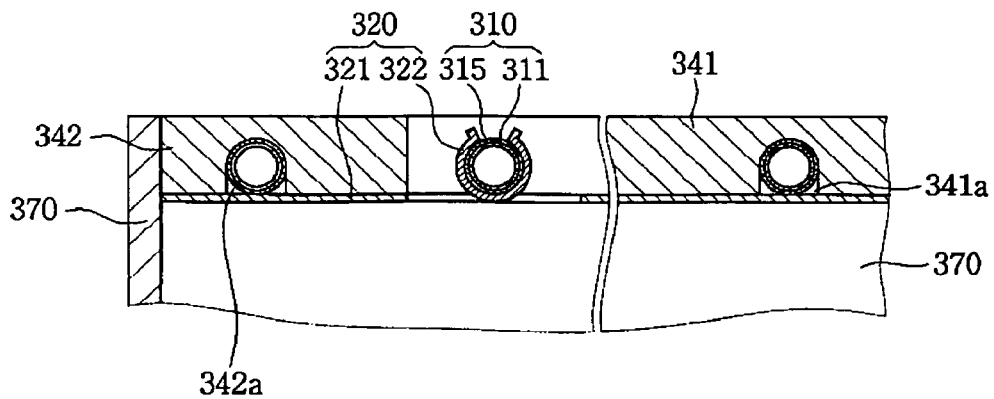
[Fig. 5]
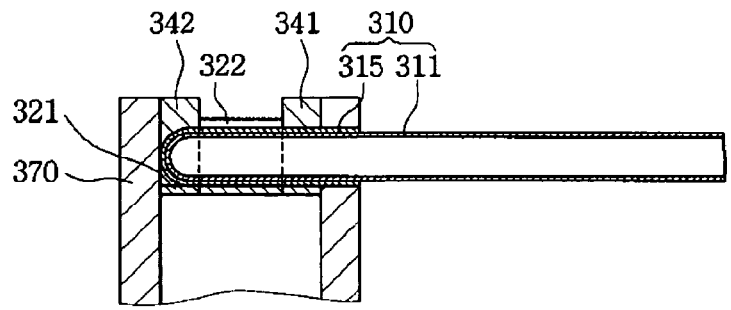
[Fig. 6]
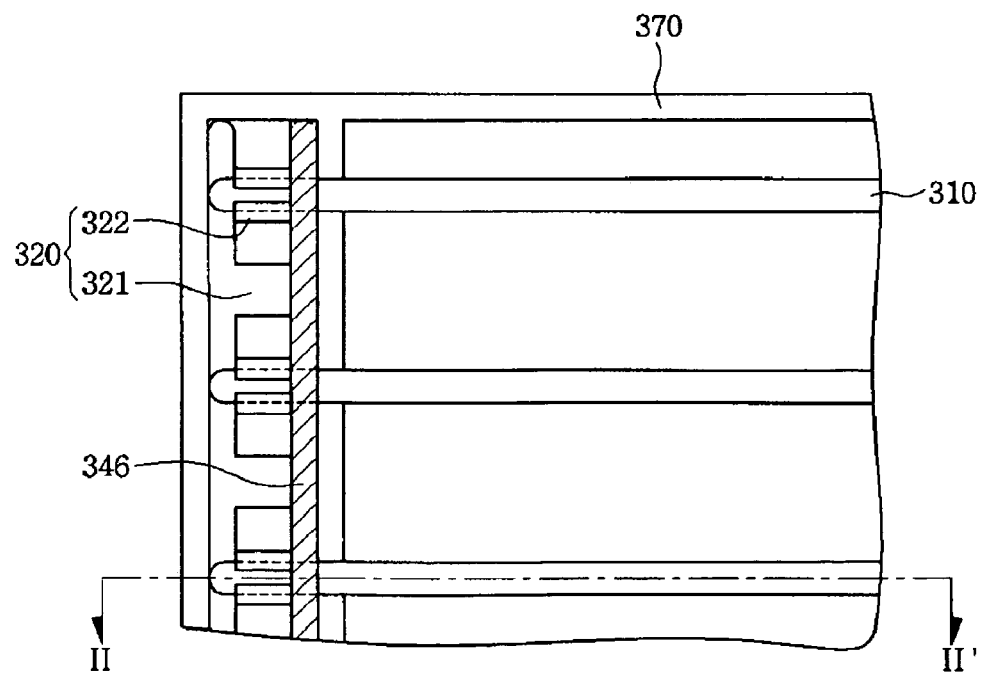
[Fig. 7]

[Fig. 8]
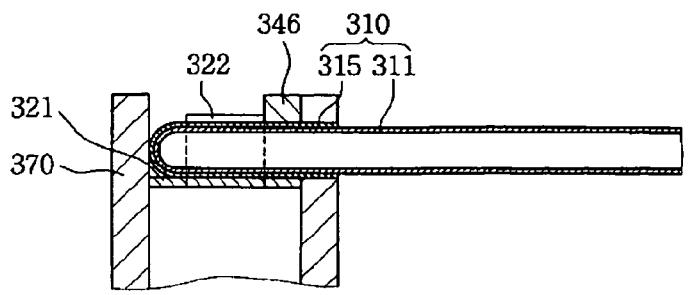
[Fig. 9]
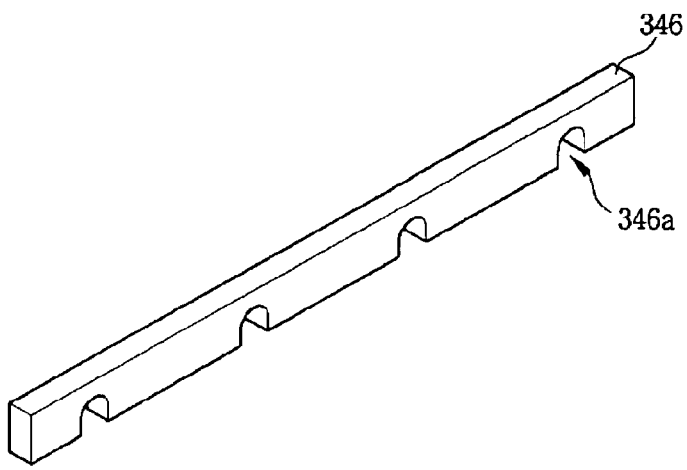
[Fig. 10]
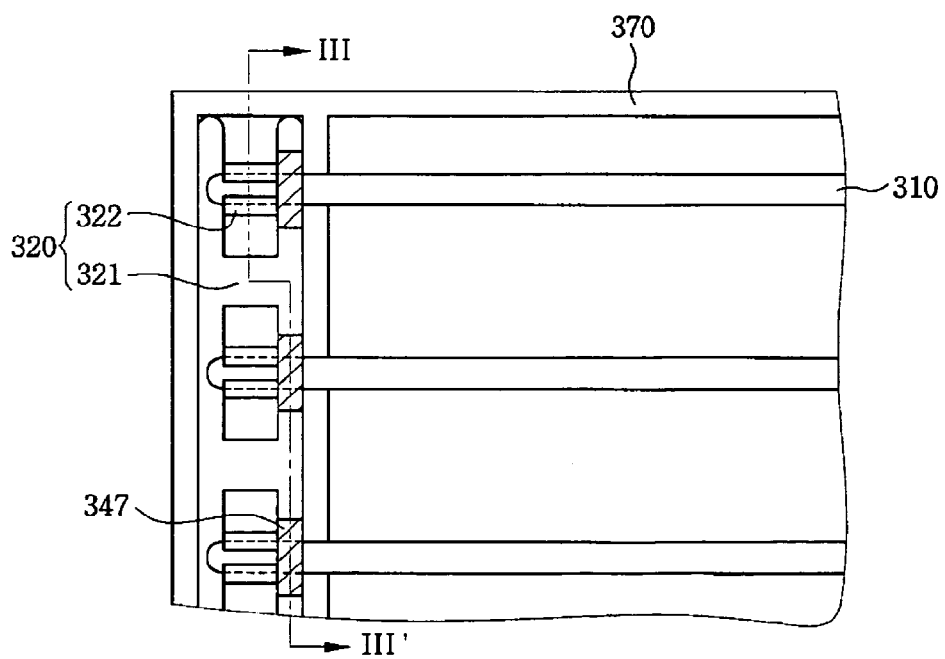
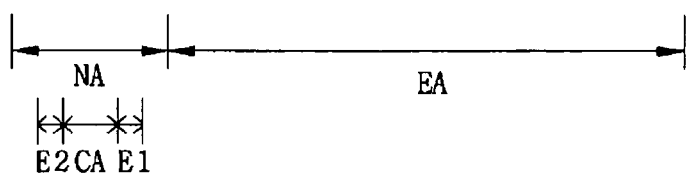

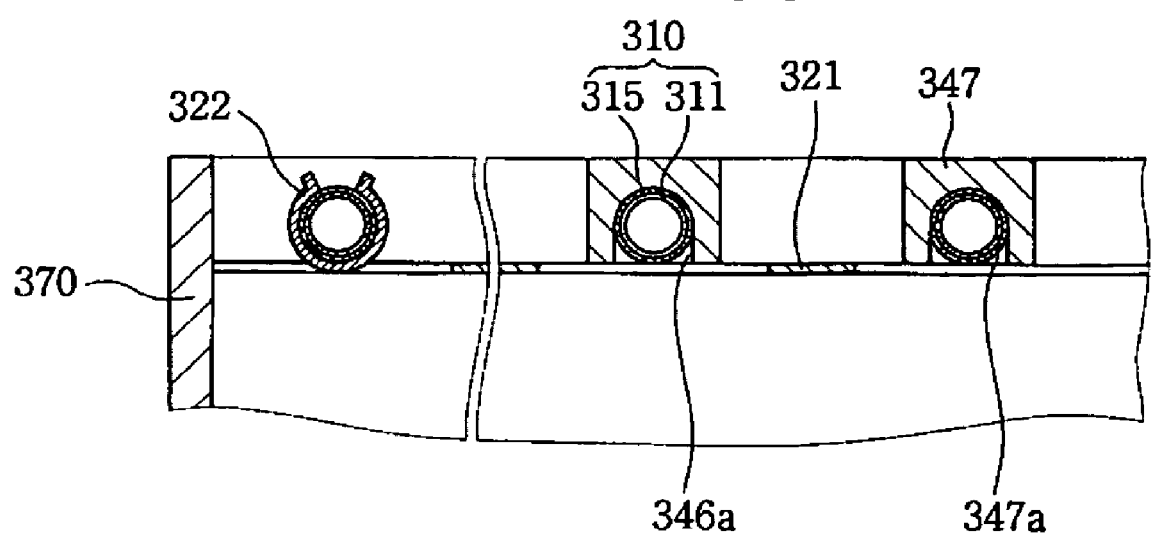
[Fig. 11]

LIQUID CRYSTAL DISPLAY APPARATUS

TECHNICAL FIELD

The present invention relates to a backlight assembly and a liquid crystal display (hereinafter, referred to as LCD) apparatus having the backlight assembly. More particularly, the present invention relates to a backlight assembly capable of improving display quality and an LCD apparatus having the backlight assembly.

BACKGROUND ART

An LCD apparatus, in general, includes an LCD panel for displaying an image and a backlight assembly supplying a light to the LCD panel.

When the LCD apparatus includes a big LCD panel, the backlight assembly may include a plurality of lamps disposed under the LCD panel and parallelly arranged with one other.

The backlight assembly may include a cold cathode fluorescent lamp (CCFL), an external electrode fluorescent lamp (EEFL), etc.

The CCFL includes a lamp electrode disposed in a lamp tube of the CCFL so that the CCFL generates a light by using penning discharge. A lamp electrode of the EEFL is disposed on external surface of an end portion of a lamp tube of the EEFL.

The EEFL (hereinafter, referred to as lamp) includes a capacitor formed between the external electrode and a discharge space so as to be driven. A plurality of the EEFL may be parallelly connected with one another, so that number of inverters that is necessary to the EEFL may be decreased.

The backlight assembly of the lamp includes a lamp securing plate and a mold frame. The lamp securing plate is combined with the end portion of the lamp on the external surface of the lamp so as to secure the lamp at a predetermined position. The lamp securing plate applies a voltage to the lamp so as to drive the lamp. The mold frame includes a receiving space for receiving the lamp securing plate.

When the lamp generates the light, heat may be generated from the external electrode. The heat is conducted to the LCD panel to decrease a display quality of the LCD panel.

DISCLOSURE OF INVENTION

Technical Problem

The present invention provides a backlight assembly capable of improving display quality.

The present invention also provides an LCD apparatus having the backlight assembly.

Technical Solution

The backlight assembly in accordance with one exemplary embodiment of the present invention includes a lamp and an insulating member. The lamp includes a lamp tube and an electrode disposed on an end portion of the lamp tube. The insulating member is combined with the end portion of the lamp so as to partially surround the electrode and to prevent a heat generated from the electrode from being conducted toward the lamp tube.

The LCD apparatus in accordance with one exemplary embodiment of the present invention includes an LCD panel for displaying an image, a backlight assembly and a first receiving container.

The backlight assembly includes a lamp and an insulating member. The lamp includes a lamp tube and an electrode disposed on an end portion of the lamp tube. The insulating member is combined with the end portion of the lamp so as to partially surround the electrode.

The first receiving container receives the backlight assembly, and makes contact with the insulating member so as to transmit the heat generated from the electrode to an exterior to the LCD apparatus.

Therefore, the insulating member prevents the heat generated from the lamp from being conducted toward the LCD panel, and transmits the heat to the exterior to the LCD apparatus through the first receiving container, thereby improving a display quality of the LCD panel.

DESCRIPTION OF DRAWINGS

The above and other advantages of the present invention will become readily apparent by reference to the following detailed description when considered in conjunction with the accompanying drawings wherein:

FIG. 1 is a cross-sectional view illustrating a backlight assembly according to an exemplary embodiment of the present invention;

FIG. 2 is an exploded perspective view illustrating a backlight assembly according to an exemplary embodiment of the present invention;

FIG. 3 is a partially cut out perspective view illustrating an insulator of a backlight assembly according to an exemplary embodiment of the present invention;

FIG. 4 is a plan view illustrating a backlight assembly according to an exemplary embodiment of the present invention;

FIG. 5 is a cross-sectional view taken along the I-I' line of FIG. 4;

FIG. 6 is a cross-sectional view taken along the IV-IV' line of FIG. 4;

FIG. 7 is a plan view illustrating a backlight assembly according to another exemplary embodiment of the present invention;

FIG. 8 is a cross-sectional view taken along the II-II' line of FIG. 7;

FIG. 9 is perspective view illustrating an insulator of a backlight assembly according to another exemplary embodiment of the present invention;

FIG. 10 is a plan view illustrating a backlight assembly according to another exemplary embodiment of the present invention; and FIG. 11 is a cross-sectional view taken along the III-III' line of FIG. 10.

BEST MODE

FIG. 1 is a cross-sectional view illustrating a backlight assembly according to an exemplary embodiment of the present invention, and FIG. 2 is an exploded perspective view illustrating a backlight assembly according to an exemplary embodiment of the present invention.

Referring to FIG. 1, the LCD apparatus 100 includes an LCD panel 200 for displaying an image, a backlight assembly 300 supplying a light to the LCD panel 200, a bottom chassis 400 for receiving the LCD panel 200 and the backlight assembly 300 and a top chassis 500 combined with the bottom chassis 400 so as to surround the LCD panel 200.

The LCD panel 200 includes a color filter substrate 210 having a pixel, a thin film transistor (TFT) substrate 220 corresponding to the color filter substrate 210 and a liquid crystal layer (not shown) interposed between the color filer and TFT substrates 210 and 220.

Referring to FIG. 2, the backlight assembly 300 includes optical sheets 330, a reflecting sheet 305, a lamp 310, a first lamp securing plate 320, a second lamp securing plate 325, a first insulator 340, a second insulator 347, a low mold frame 370 and an upper mold frame 390.

The optical sheet 330 is disposed over the lamp 310. The reflecting sheet 305 is disposed under the lamp 310 to reflect a portion of a light generated from the lamp 310.

The backlight assembly 300 may include a plurality of the lamps 310.

The lamps 310 are parallelly disposed in a direction perpendicular to a longitudinal direction of the lamp 310. Each of the lamps 310 includes a lamp tube 311, electrodes 315 disposed on end portions of the lamp tube 311 and a discharge gas (not shown) injected into the lamp tube 311. The lamp 310 includes an electrode area (NA) and a light emitting area (EA). The electrode 315 is formed in the electrode area (NA). The light emitting area (EA) is disposed adjacent to the electrode area (NA), and the light is generated in the light emitting area (EA).

The electrode 315 includes an external electrode that surrounds the external surface of the end portions of the lamp tube 31. The electrode 315 comprises a metal. A lamp driving voltage from an external device (not shown) is applied to the electrodes 315 so as to drive the lamp 310.

The first and second lamp securing plates 320 and 325 are disposed on each of the end portions of the lamp 310, respectively. The structure of the first lamp securing plate 320 is substantially identical to the structure of the second lamp securing plate 325.

The first lamp securing plate 320 includes a base 321 and a securing clip 322 upwardly protruded from the base 321.

The first lamp securing plate 320 may include a plurality of the securing clips 322. The number of the securing clip 322 is equal to the number of the lamps 310. The securing clips 322 are parallelly arranged corresponding to the lamps 310. The securing clips 322 are combined with the end portions of the lamps 310 so as to secure the lamps 310, and the securing clips 322 are electrically connected to the electrodes 315.

The low mold frame 370 includes a first receiving space 371 for receiving the first lamp securing plate 320 and a second receiving space 372 for receiving the second lamp securing plate 325. The first and second receiving spaces 371 and 372 correspond to the electrode area (NA). The low mold frame 370 secures the electrode area (NA) so that the light emitting area (EA) is exposed, thereby improving efficiency of the light generated from the lamp 310.

FIG. 3 is a partially cut out perspective view illustrating an insulator of a backlight assembly according to an exemplary embodiment of the present invention.

The structure of the first insulator 340 is substantially identical to the structure of the second insulator 347.

Referring to FIGS. 2 and 3, the first insulator 340 is extended in a direction perpendicular to a longitudinal direction of the lamp 310. The first insulator 340 includes a first rod 341 and a second rod 342. End portions of the first and second rods 341 and 342 make contact with the first lamp securing plate 320.

The first and second rods 341 and 342 include a first hole 341a and a second hole 342a, respectively. The first and second rods 341 and 342 may include a plurality of the first and second holes 341a and 342a. The first and second holes 341a and 342a correspond to the first lamp securing plate 320. When the end portions of the lamp 310 are received in the first and second holes 341a and 342a, the first and second rods 341 and 342 partially surround the electrodes 315 of the lamp 310. Alternatively, the second rod 342 may include a groove or a recess to prevent the axial movement of the lamp 310.

The first insulator 340 includes a connecting part 343 disposed on end portions of the first and second rods 341 and 342. The connecting part 343 is integrally formed with the first and second rods 341 and 342. The connecting part 343 connects the first rod 341 to the second rod 342 so that the first and second rods 341 and 342 are combined together with the lamp 310.

The first insulator 340 includes a third hole 345 extended in a direction parallel with the securing clip 321 of the first lamp securing plate 302. The connecting part 343, the first rod 341 and the second rod 342 define the third hole 345. When the first insulator 340 is combined with the first lamp securing plate 320, the securing clip 321 is exposed through the third hole 345.

Referring again to FIG. 1, the first insulator 340 is combined with the lamp 310, and the first insulator 340 makes contact with the bottom chassis 400 receiving the low mold frame 370. The heat generated from the electrode 315 during light emitting from the lamp 310 is conducted to the bottom chassis 400 through the first insulator 340 and the third hole 345. The heat conducted to the bottom chassis 400 is transmitted to an exterior to the LCD apparatus 100. The first insulator 340 protects the LCD panel 200 from an impact that is provided from an exterior to the LCD apparatus 100. The first insulator 340 may cover a portion of the electrode 315 so that the heat may be easily conducted through the third hole 345, and the securing clip 322 may be disposed at a position corresponding to the third hole 345.

FIG. 4 is a plan view illustrating a backlight assembly according to an exemplary embodiment of the present invention, FIG. 5 is a cross-sectional view taken along the I-I' line of FIG. 4, and FIG. 6 is a cross-sectional view taken along the IV-IV' line of FIG. 4. Referring now in specific detail to FIGS. 4 to 6 in which the same reference numerals denote the same elements in FIGS. 1 to 3, and thus any further detailed descriptions concerning the same elements will be omitted.

Referring to FIGS. 4 to 6, a first insulator 340 surrounds electrodes 315 of lamps 310.

The lamps 310 are disposed on the low mold frame 370. Each of the lamps 310 includes an electrode area (NA) having the electrode 315 and a light emitting area (EA) adjacent to the electrode area (NA). A light is generated from the light emitting area (EA).

A first lamp securing plate 320 securing the lamp 310 is disposed in the electrode area (NA). The electrodes 315 are confined with a securing clip 322 disposed on the lamp securing plate 320.

The electrode area (NA) includes a clip region (CA), a first region (E1) and a second region (E2). The securing clip 322 combined with the electrode 315 is disposed in the clip region (CA). The first and second regions (E1 and E2) are disposed adjacent to the clip region (CA), and the first region (E1) is opposite to the second region (E2). The first region (E1) is disposed between the light emitting area (EA) and the clip region (CA). The second region (E2) is disposed opposite to the first region (E1) by interposing the clip region (CA) between the first and second regions (E1 and E2).

The first insulator 340 is disposed in the electrode area (NA) so as to surround the electrode 315 disposed in the first and second regions (E1 and E2). The first rod 341 is disposed in the first region (E1), and the second rod 342 is disposed in the second region (E2).

When the lamp 310 is received in the first and second holes 341a and 342a formed in the first and second rods 341 and 342, the first and second rods 341 and 342 cover the electrodes 315 disposed in the first and second regions (E1 and E2), respectively. Therefore, the first insulator 340 surrounds each of the electrodes 315 of the lamp 310, and the area where the first insulator 340 makes contact with the electrode 315 is increased.

The third hole 345 exposes the securing clip 322 disposed in the clip region (CA) and the electrode 315 combined with the securing clip 322. The connecting part 343, the first rod 341 and the second rod 342 are combined so as to form the third hole 345.

The first insulator 340 comprises highly thermally conductive material so as to transmit the heat generated from the electrode 315 to the bottom chassis 400. The first insulator 340 electrically insulates the bottom chassis 400 from the first lamp securing plate 320.

The first insulator 340 also thermally insulates the heat generated from the electrode area (NA) from the light emitting area.

The first insulator 340 comprises a highly elastic material so as to protect the lamp 310 that is fragile, and secures the lamp 310 to prevent the lamp 310 from drifting.

Therefore, the LCD apparatus 100 includes the first insulator 340 so as to improve a display quality of the LCD apparatus.

FIG. 7 is a plan view illustrating a backlight assembly according to another exemplary embodiment of the present invention, FIG. 8 is a cross-sectional view taken along the II-II' line of FIG. 7, and FIG. 9 is perspective view illustrating an insulator of a backlight assembly according to another exemplary embodiment of the present invention. Referring now in specific detail to FIGS. 7 to 9 in which the same reference numerals denote the same elements in FIGS. 1 to 3, and thus any further detailed descriptions concerning the same elements will be omitted.

Referring to FIGS. 7 to 9, an insulator 346 partially surrounds electrodes 315 of lamps 310.

The lamps 310 are arranged on a low mold frame 370. The electrodes 315 are disposed in an electrode area (NA). A first lamp securing plate 320 is combined with the low mold frame 370, and disposed in an electrode area (NA). The electrodes 315 are combined with securing clips 322 of the first lamp securing plate 320.

The insulator 346 is extended in a direction perpendicular to the longitudinal direction of the lamps 310. End portions of the insulator 346 make contact with the first lamp securing plate 320.

Now referring to FIG. 9, the insulator 346 includes a hole 346a. The insulator 346 may include a plurality of the holes 346a. End portions of the lamps 310 are received in the holes 346a. Hence, the insulator 346 surrounds the electrode 315 of the lamp 310 so that an area where the insulator 346 makes contact with the electrode 315 is increased.

In addition, the insulator 346 makes contact with the bottom chassis 400 so as to conduct heat generated from the electrode 315 to the bottom chassis 400. The heat conducted to the bottom chassis 400 is then transmitted to an exterior to the LCD apparatus 100.

The insulator 346 includes a first region (E1) disposed between the clip region (CA) and the light emitting area (EA). The electrode area (NA) includes the first region (E1). The insulator 346 prevents the heat from being conducted toward the light emitting area (EA), thereby improving display quality of the LCD apparatus 100.

FIG. 10 is a plan view illustrating a backlight assembly according to another exemplary embodiment of the present invention, and FIG. 11 is a cross-sectional view taken along the III-III' line of FIG. 10. Referring now in specific detail to FIGS. 10 and 11 in which the same reference numerals denote the same elements in FIGS. 1 to 3, and thus any further detailed descriptions concerning the same elements will be omitted.

Referring to FIGS. 10 and 11, the backlight assembly includes a plurality of lamps 310 and insulators 347. The lamps 310 arc parallelly arranged with one another. The insulators 347 partially surround electrodes 315 of the lamps 310. Number of the insulators 347 is equal to number of the lamps 310 so that each of the insulators 347 is corresponding to each of the lamps 310.

The insulator 347 is combined with the electrode 315 of the lamp 310 in electrode area (NE). The electrode area (NE) includes a first region (E1). The insulator 347 is disposed in the first region (E1) disposed between the clip region (CA) and the light emitting area (EA).

The insulator 347 includes a hole 347a. The insulator 347 may include a plurality of the holes 347a. The hole 347a receives the end portion of the lamp 310 having the electrodes 315.

Therefore, the insulator 347 prevents a heat generated from the electrode 315 from being conducted to the light emitting area (EA), and the insulator 347 makes contact with the bottom chassis 400, thereby transmitting the heat to an exterior to the LCD apparatus 100 through the bottom chassis 400. Hence, display quality of the LCD apparatus 100 is improved.

Alternatively, each of the insulators 347 may be combined with a plurality of the lamps 310.

INDUSTRIAL APPLICABILITY

As mentioned above, an insulator is disposed on a lamp securing plate so as to be combined with an end portion of a lamp, and makes contact with a bottom chassis.

Therefore, the insulator prevents a heat generated from the electrode from being conducted to an LCD panel so as to transmit the heat to an exterior to an LCD apparatus through the bottom chassis, thereby improving display quality of the LCD apparatus.

In addition, the insulator surrounds the end portion that is combined with the lamp securing plate so as to protect the lamp from an impact, and secures the lamp so as to prevent the lamp from drifting.

Although the exemplary embodiments of the present invention have been described, it is understood that the present invention should not be limited to these exemplary embodiments but various changes and modifications can be made by one ordinary skilled in the art within the scope of the present invention as hereinafter claimed.

The invention claimed is:

1. A backlight assembly comprising:
   a lamp that includes a lamp tube and an external electrode disposed on an end portion of the lamp tube to surround an external surface of the lamp tube;
   a lamp securing member securing the lamp, the lamp securing member including a securing clip electrically connected to the external electrode, wherein the securing clip combined with the end portion of the lamp tube secures the lamp; and an insulating member combined with the end portion of the lamp to prevent a heat generated from the electrode from being conducted toward the lamp tube.

2. The backlight assembly of claim 1, further comprising:
a receiving container including a receiving space that receives the lamp securing member, wherein the lamp securing member further comprises a base substrate and the securing clip is upwardly protruded from the base.

3. The backlight assembly of claim 2, wherein the lamp comprises an electrode area and a light emitting area adjacent to the electrode area, a light is emitted through the light emitting area, and the electrode is disposed at the electrode area.

4. The backlight assembly of claim 3, wherein the insulating member is extended in a direction perpendicular to a longitudinal direction of the lamp tube, and the insulating member is disposed between a clip region having the securing clip in the electrode area and the light emitting area.

5. The backlight assembly of claim 1,
wherein the insulating member comprises a hole that receives the end portion of the lamp, a recess that receives the end portion of the lamp or a groove that receives the end portion of the lamp.

6. The backlight assembly of claim 2,
wherein the insulating member covers a portion of the electrode, and the securing clip is disposed at a position corresponding to a remaining portion of the electrode.

7. A liquid crystal display (LCD) apparatus comprising:
an LCD panel displaying an image;
a backlight assembly including a lamp having a lamp tube and an external electrode disposed on an end portion of the lamp tube to surround an external surface of the lamp tube, a lamp securing member having a securing clip combined with the end portion of the lamp tube to secure the lamp and electrically connected to the external electrode and an insulating member combined with the end portion of the lamp so as to surround the electrode; and
a first receiving container receiving the backlight assembly and making contact with the insulating member so as to conduct the heat generated from the electrode to an exterior to the LCD apparatus.

8. The LCD apparatus of claim 7, wherein the first receiving container comprises a metal.

9. The backlight assembly of claim 7, further comprising:
a second receiving container including a receiving space that receives the lamp securing plate, wherein the lamp securing member further comprises a base and the securing clip is protruded from the base.

10. The LCD apparatus of claim 9, wherein the lamp comprises an electrode area having the electrode and a light emitting area adjacent to the electrode area so as to generate a light, and the electrode area includes a clip region having the securing clip, a first region adjacent to the clip region and a second region adjacent to the clip region.

11. The LCD apparatus of claim 10, wherein the insulating member comprises a first rod disposed in the first region, a second rod disposed in the second region and a connecting part connecting an end portion of the first rod to an end portion of the second rod.

12. The LCD apparatus of claim 11,
wherein the first and second rods comprise holes receiving the end portion of the lamp, recesses receiving the end portion of the lamp or grooves receiving the end portion of the lamp.

13. The LCD apparatus of claim 11,
wherein the connector is integrally formed with the first and second rods.

14. The LCD apparatus of claim 10,
wherein the first region is disposed between the clip region and the light emitting area, and the insulating member is extended in a direction perpendicular to a longitudinal direction of the lamp tube so as to be disposed in the first region.

15. The LCD apparatus of claim 7,
wherein the backlight assembly further comprises a plurality of the lamps parallelly arranged with one another.

16. The LCD apparatus of claim 15,
wherein the backlight assembly further comprises a plurality of the insulating members, and each of the insulating members is combined with one of the lamps.

17. The LCD apparatus of claim 15,
wherein the backlight assembly further comprises a plurality of the insulating members, and each of the insulating members is confined with the plurality of the lamps.

18. The backlight assembly of claim 9,
wherein the insulating member covers a portion of the electrode, and the securing clip is disposed at a position corresponding to a remaining portion of the electrode.

* * * * *